United States Patent
Moon

(10) Patent No.: US 10,497,924 B2
(45) Date of Patent: Dec. 3, 2019

(54) SECONDARY BATTERY

(71) Applicant: SAMSUNG SDI CO., LTD., Yongin-si, Gyeonggi-do (KR)

(72) Inventor: Jin Young Moon, Yongin-si (KR)

(73) Assignee: Samsung SDI Co., Ltd., Yongin-si, Gyeonggi-Do (KR)

( * ) Notice: Subject to any disclaimer, the term of this patent is extended or adjusted under 35 U.S.C. 154(b) by 195 days.

(21) Appl. No.: 15/405,952

(22) Filed: Jan. 13, 2017

(65) Prior Publication Data

US 2017/0214027 A1    Jul. 27, 2017

(30) Foreign Application Priority Data

Jan. 21, 2016   (KR) .................. 10-2016-0007583

(51) Int. Cl.
| | | |
|---|---|---|
| *H01M 2/30* | (2006.01) | |
| *H01M 2/26* | (2006.01) | |
| *H01M 2/12* | (2006.01) | |
| *H01M 2/34* | (2006.01) | |
| *H01M 10/0525* | (2010.01) | |

(52) U.S. Cl.
CPC ......... *H01M 2/263* (2013.01); *H01M 2/1241* (2013.01); *H01M 2/30* (2013.01); *H01M 2/345* (2013.01); *H01M 2/348* (2013.01); *H01M 10/0525* (2013.01); *H01M 2200/106* (2013.01); *H01M 2200/20* (2013.01)

(58) Field of Classification Search
None
See application file for complete search history.

(56) References Cited

U.S. PATENT DOCUMENTS

| | | | |
|---|---|---|---|
| 2009/0317707 A1 | 12/2009 | Cha | |
| 2016/0126556 A1* | 5/2016 | Bak ................... | H01M 4/661 429/185 |

FOREIGN PATENT DOCUMENTS

| | | | |
|---|---|---|---|
| JP | 11297300 A | * | 10/1999 |
| JP | 2007273258 A | * | 10/2007 |
| KR | 10-2009-0132494 A | | 12/2009 |
| KR | 10-2011-0074180 A | | 6/2011 |
| WO | WO 2011/078455 A1 | | 6/2011 |

* cited by examiner

*Primary Examiner* — Tracy M Dove
(74) *Attorney, Agent, or Firm* — Lee & Morse, P.C.

(57) ABSTRACT

A secondary battery includes an electrode assembly including a first electrode plate including a first electrode tab, a second electrode plate including a second electrode tab, and a separator interposed between the first electrode plate and the second electrode plate, a case accommodating the electrode assembly, and a cap assembly covering a top portion of the case. Any one of the first electrode tab and the second electrode tab includes a multi-layer clad electrode tab including two copper (Cu) layers.

4 Claims, 9 Drawing Sheets

SECONDARY BATTERY

CROSS-REFERENCE TO RELATED APPLICATION

Korean Patent Application No. 10-2016-0007583, filed on Jan. 21, 2016, in the Korean Intellectual Property Office, and entitled: "Secondary Battery," is incorporated by reference herein in its entirety.

BACKGROUND

1. Field

One or more embodiments relate to secondary batteries.

2. Description of the Related Art

In general, a secondary battery is formed by accommodating an electrode assembly in a case together with an electrolyte and sealing a top opening of the case with a cap assembly.

Secondary batteries are generally classified into cylindrical batteries, rectangular batteries, and pouch-type batteries according to their structural characteristics. Also, electrode assemblies are generally classified into a jellyroll type and a stack type according to the structures of positive electrode plates, separators, and negative electrode plates constituting the secondary batteries.

Among the electrode assemblies, in the case of a jellyroll-type electrode assembly, a metal foil used as a current collector is coated with an electrode active material or the like, and the resulting structure is dried, pressed, and cut in a band form of a predetermined width and length. Then, a separator is interposed and wound between a positive electrode plate and a negative electrode plate to manufacture the jellyroll-type electrode assembly.

SUMMARY

Embodiments are directed to a secondary battery including an electrode assembly including a first electrode plate including a first electrode tab, a second electrode plate including a second electrode tab, and a separator interposed between the first electrode plate and the second electrode plate, a case accommodating the electrode assembly, and a cap assembly covering a top portion of the case. Any one of the first electrode tab and the second electrode tab includes a multi-layer clad electrode tab including two copper (Cu) layers.

The multi-layer clad electrode tab may include five layers.

The multi-layer clad electrode tab may include nickel-copper-nickel-copper-nickel (Ni—Cu—Ni—Cu—Ni) layers.

In the multi-layer clad electrode tab, a sum of thicknesses of the Cu layers may be less than a sum of thicknesses of the Ni layers.

The sum of the thicknesses of the Cu layers may be less than or equal to 30% of a total thickness of the clad electrode tab.

The multi-layer clad electrode tab may be a negative electrode tab.

The multi-layer clad electrode tab may further include post-plating layers on both outermost sides thereof.

BRIEF DESCRIPTION OF THE DRAWINGS

Features will become apparent to those of ordinary skill in the art by describing in detail exemplary embodiments with reference to the attached drawings in which.

DETAILED DESCRIPTION

Figure 1:
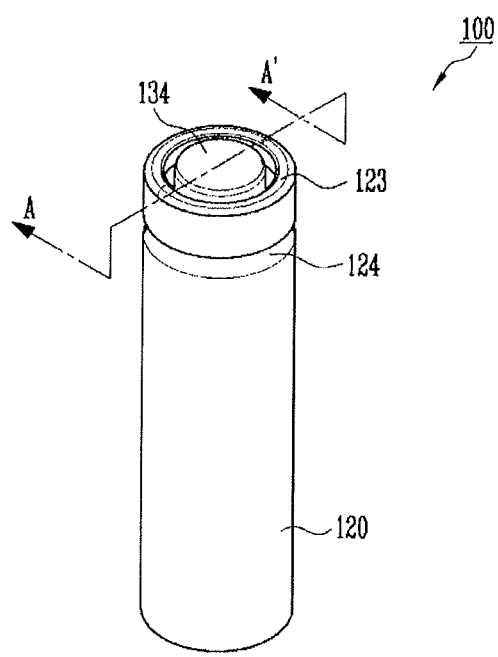
FIG. 1 illustrates a perspective view of a secondary battery according to an embodiment.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art.

In the drawing figures, the dimensions of layers and regions may be exaggerated for clarity of illustration. Like reference numerals refer to like elements throughout.

Figure 2:
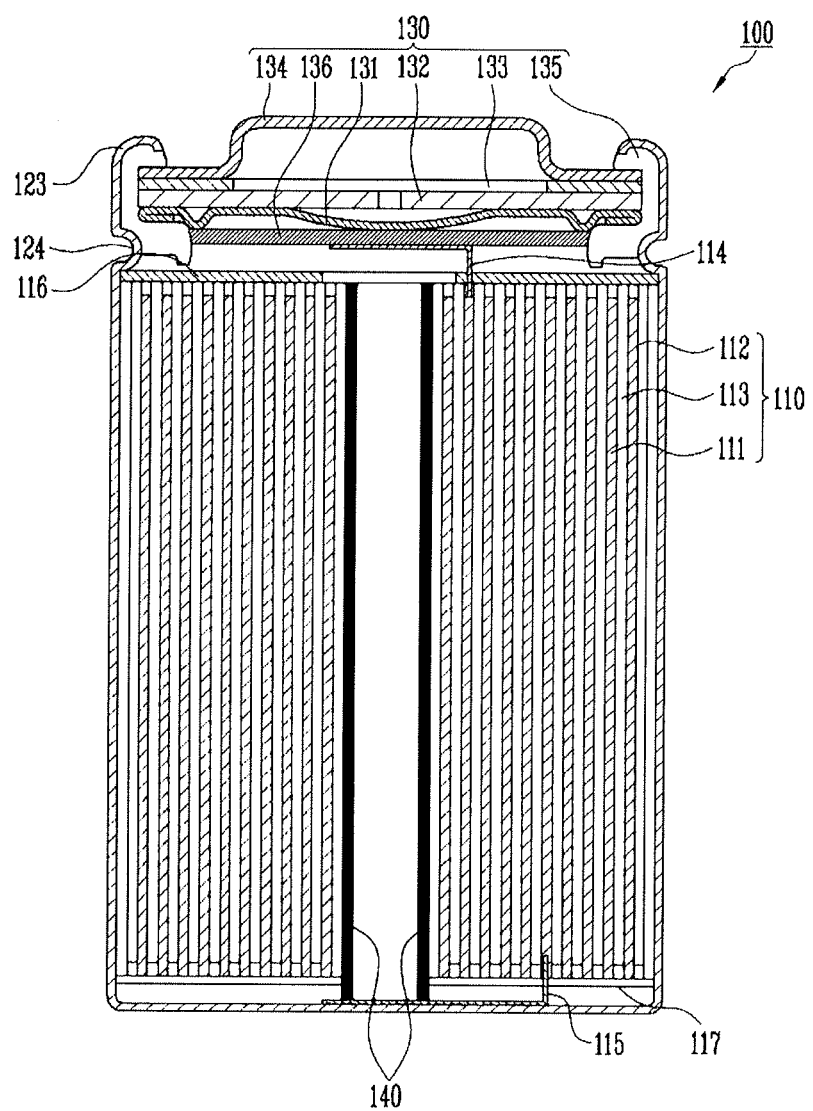
FIG. 2 illustrates a cross-sectional view taken along a line A-A' of FIG. 1.

FIG. 1 illustrates a perspective view of a secondary battery according to an embodiment, and FIG. 2 illustrates a cross-sectional view taken along a line A-A' of FIG. 1.

Referring to FIGS. 1 and 2, a cylindrical lithium (Li) secondary battery 100 according to an embodiment may include an electrode assembly 110 generating a voltage difference in a charge/discharge process, a case 120 accommodating the electrode assembly 110, a cap assembly 130 assembled to a top portion of the case 120 to prevent the deviation of the electrode assembly 110 therefrom, and an electrolyte injected into the case 120 to allow the movement of lithium ions through the electrode assembly 110.

The electrode assembly 110 may include a first electrode plate 111, a second electrode plate 112, and a separator 113 interposed between the first electrode plate 111 and the second electrode plate 112 to prevent a short and to allow only the movement of lithium ions. The first electrode plate 111 may be coated with a positive electrode active material, for example, a transition metal oxide such as $LiCoO_2$, $LiNiO_2$, or $LiMn_2O_4$, and the second electrode plate 112 may be coated with a negative electrode active material such as graphite or carbon. The first electrode plate 111, the second electrode plate 112, and the separator 113 may be wound in a substantially jellyroll for iii to be accommodated in the case 120. Hereinafter, for convenience of description, the first electrode plate 111 will be referred to as a positive electrode plate, and the second electrode plate 112 will be referred to as a negative electrode plate.

For example, the negative electrode plate 112 may include copper (Cu) foil, the positive electrode plate 111 may include aluminum (Al) foil, and the separator 113 may include polyethylene or polypropylene. A negative electrode tab 115 extending after protruding downwardly to a predetermined length may be welded to the negative electrode plate 112. A positive electrode tab 114 protruding upwardly to a predetermined length may be welded to the positive electrode plate 111. In some implementations, a positive electrode and a negative electrode may be formed in an opposite manner thereto.

The electrode assembly 110 may be wound in a cylindrical jellyroll form, and a predetermined space may be formed in the center of the electrode assembly 110. A center pin 140 having the shape of a hollow rod may be located in the predetermined space. The center pin 140 may support the wound electrode assembly 110 to prevent unwinding. A bottom portion of the center pin 140 may press and adhere the negative electrode tab 115 to the case 120. For example, the electrode assembly 110 may be inserted into the case 120 and the center pin 140 may be inserted into the central space thereof to adhere the negative electrode tab 115 to the case 120 and simultaneously support the jellyroll so as to not be loosened.

The case 120 may have a substantially cylindrical shape, in which a cylindrical surface having a predetermined diameter may be formed. A bottom surface having the shape of a substantially circular plate may be formed at a bottom portion of the cylindrical surface. A top portion of the case 120 may be open. The electrode assembly 110 may be inserted into the inside thereof through the top portion of the cylindrical case 120. The negative electrode tab 115 of the electrode assembly 110 may be welded to the bottom surface of the cylindrical case 120. Thus, the cylindrical case 120 may operate as the negative electrode. In some implementations, the positive electrode tab 114 may be welded to the bottom surface of the cylindrical case 120 such that the cylindrical case 120 may operate as the positive electrode.

A top insulating member 116 may be located at the top surface of the electrode assembly 110, and a bottom insulating member 117 may be located at the bottom surface of the electrode assembly 110. Accordingly, an undesired electrical short between the electrode assembly 110 and the cylindrical case 120 may be prevented. The cylindrical case 120 may include, for example, stainless steel, aluminum (Al), or an equivalent thereof.

A crimping portion 123 bent inwardly may be formed at the top of the cylindrical case 120. The crimping portion 123 may press the cap assembly 130 coupled thereto. In the cylindrical case 120, an inward protrusion portion 124 may be formed at a position corresponding to a top outer peripheral surface of the electrode assembly 110. The inward protrusion portion 124 may press the cap assembly 130 from the bottom portion of the inward protrusion portion 124 and prevent the upward deviation of the electrode assembly 110. The thickness of the inward protrusion portion 124 may be greater than the thickness of remaining portions of the cylindrical case 120, to improve the process stability in the process of forming the inward protrusion portion 124.

The crimping portion 123 and the inward protrusion portion 124 may firmly support and fix the cap assembly 130 to the cylindrical surface of the cylindrical case 120 and may prevent the leakage of the electrolyte. Also, the inward protrusion portion 124 may suppress the vertical movement of the electrode assembly 110.

The cap assembly 130 may be coupled to the top portion of the cylindrical case 120. The cap assembly 130 may include a safety vent 131, a circuit board 132, a positive temperature coefficient (PTC) element 133, a cap-up portion 134, an insulating gasket 135, and a cap-down portion 136. In the case of an increase in the internal pressure of the case 120, the safety vent 131 may be deformed or ruptured to damage the circuit board 132 located thereon or to discharge the gas thereof to the outside thereof. In this case, the circuit board 132 may be damaged to block the current flowing in the battery.

The PTC element 133 may be located on the circuit board 132 to block a current in the event of an overcurrent. The conductive cap-up portion 134 providing a positive electrode voltage (or a negative electrode voltage) to the outside thereof and having a plurality of through holes facilitating gas discharge may be located on/over the PTC element 133. Contacting portions of the safety vent 131, the circuit board 132, the PTC element 133, the cap-up portion 134, and the cap-down portion 136 contacting the case 120 may be covered with the insulating gasket 135. Accordingly, a direct short with the case 120 may not occur.

The electrolyte may function as a medium for moving the lithium ions generated by the electrochemical reaction from the positive electrode and the negative electrode in the battery in the charge/discharge process. The electrolyte may include, for example, a non-aqueous organic electrolyte that is a mixture of lithium salts and high-purity organic solvents. In some implementations, the electrolyte may include, for example, a polyelectrolyte-based polymer.

In general, the positive electrode tab 114 may be formed of aluminum (Al) or Al alloy, and the negative electrode tab 115 may be formed of nickel (Ni) or Ni alloy. Recently, high-capacity and high-power secondary batteries have become increasingly desirable. In order to manufacture such high-power secondary batteries, the current application capability of electrode tabs may be improved to reduce the resistance thereof, and the importance of heat reduction and short circuit prevention may be emphasized accordingly.

According to embodiments, the negative electrode tab 115 may be a multi-layer clad electrode tab to reduce a heat generation amount of a negative electrode portion and prevent a short circuit thereof. Accordingly, a high-power and high-stability secondary battery may be implemented. The multi-layer clad electrode tab may include two Cu layers. The Cu layers may reduce the resistance of the negative electrode tab 115. However, if the Cu layer were to be applied alone to the negative electrode tab 115, the weldability of the negative electrode tab 115 could be degraded. Accordingly, by forming the negative electrode tab 115 as a five-layer clad electrode tab of Ni—Cu—Ni—Cu—Ni, the weldability thereof may be improved and the resistance thereof may be reduced.

Figure 3A:
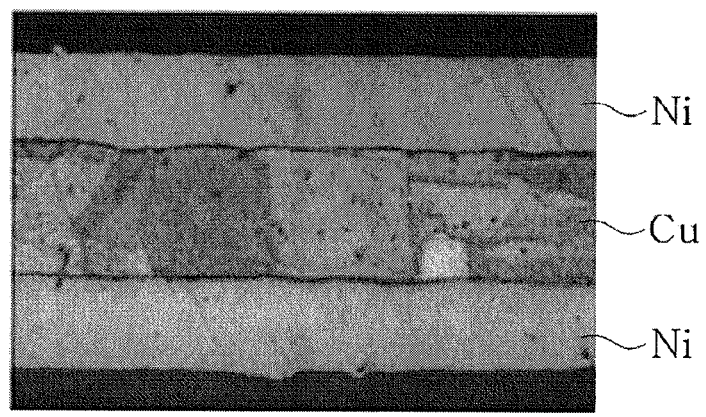
FIG. 3A illustrates a picture of a general three-layer clad negative electrode tab.
Figure 3B:
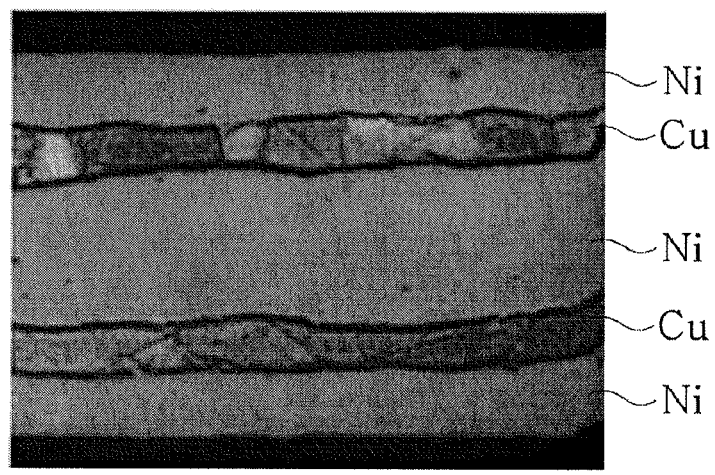
FIG. 3B illustrates a picture of a five-layer clad negative electrode tab according to an embodiment.
Figure 4A:
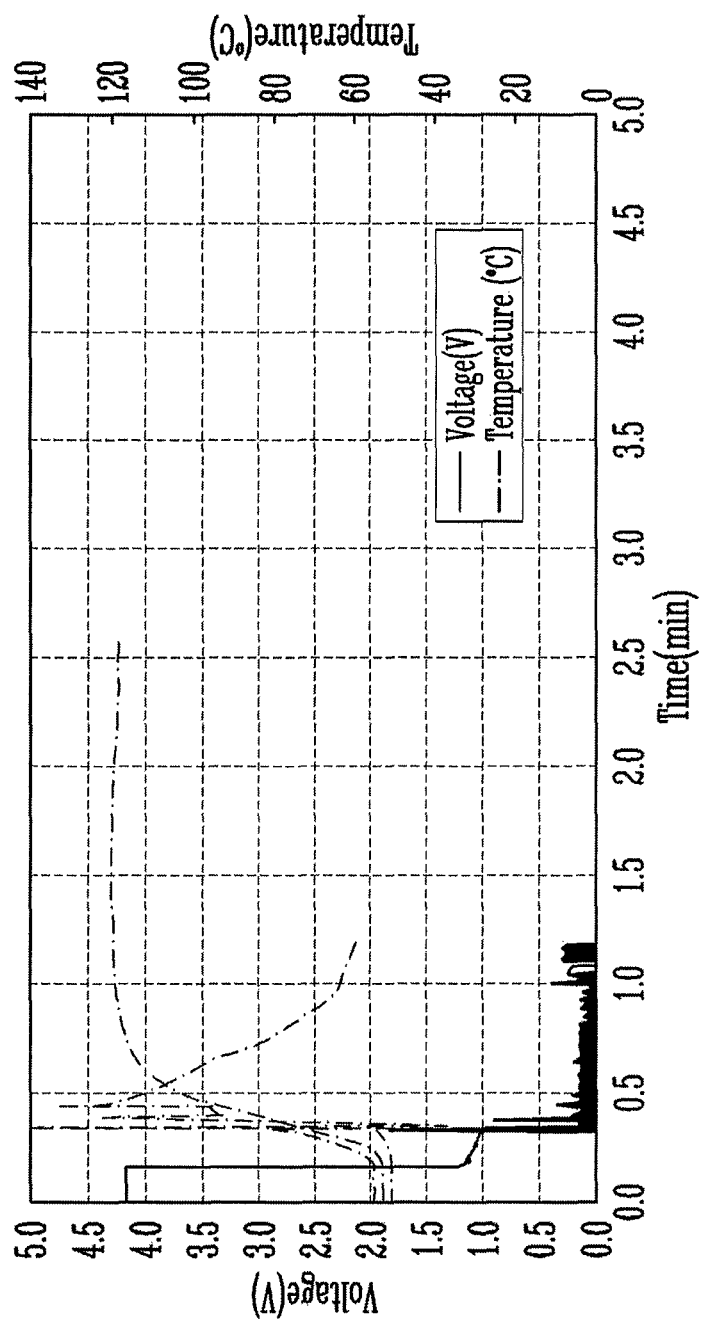
FIG. 4A illustrates a graph of time-dependent voltages and temperatures when a negative electrode tab is a three-layer clad tab.
Figure 4B:
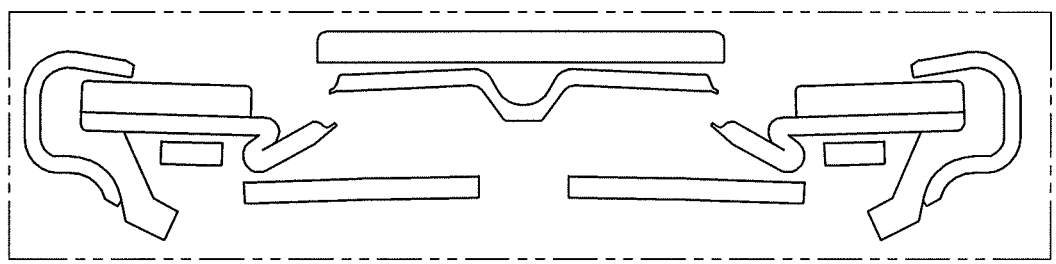
FIG. 4B illustrates a picture of a secondary battery when a negative electrode tab is a three-layer clad tab.
Figure 5A:
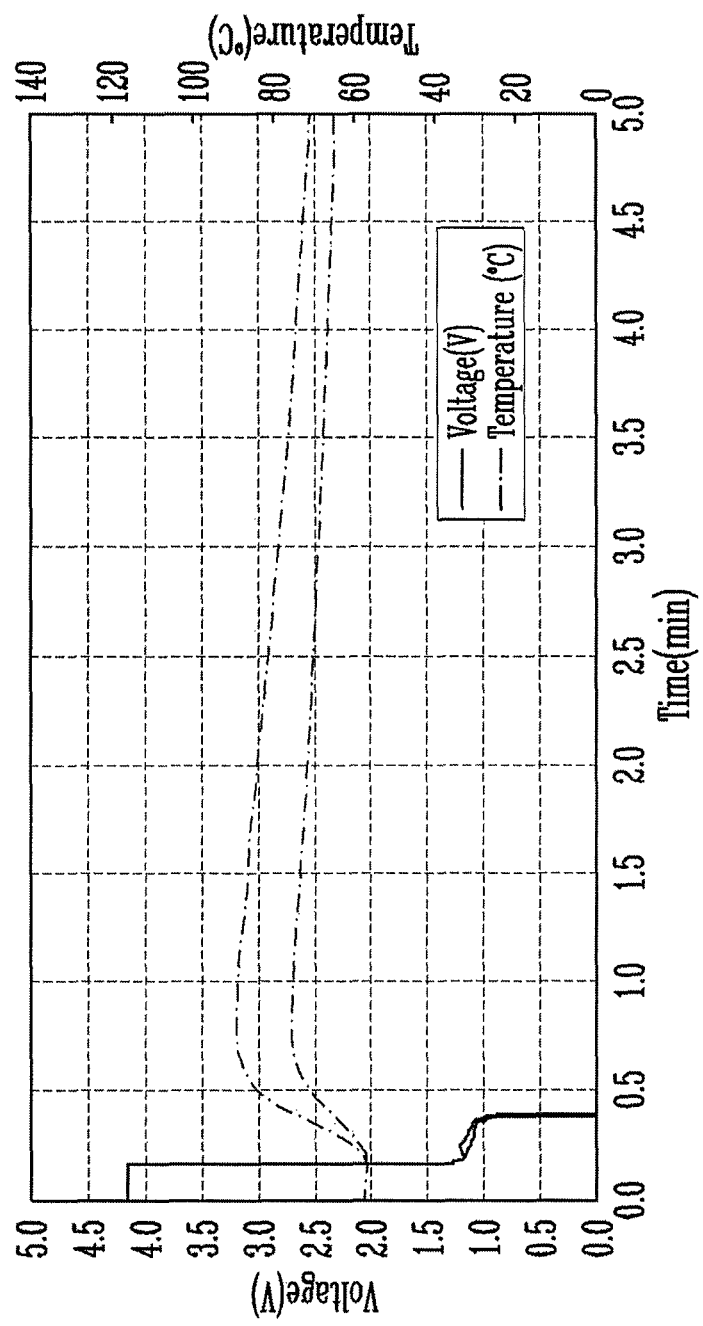
FIG. 5A illustrates a graph of time-dependent voltages and temperatures when a five-layer clad tab is applied to a negative electrode tab according to an embodiment.
Figure 5B:
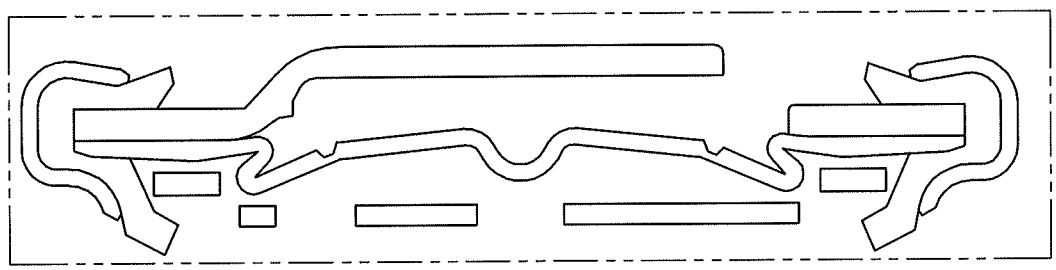
FIG. 5B illustrates a picture of a secondary battery when a five-layer clad tab is applied to a negative electrode tab according to an embodiment.

FIG. 3A illustrates a picture illustrating a three-layer clad negative electrode tab, and FIG. 3B illustrates a picture illustrating a five-layer clad negative electrode tab according to an embodiment. FIG. 4A illustrates a graph showing time-dependent voltages and temperatures when a negative electrode tab is a three-layer clad tab. FIG. 4B illustrates a picture of a secondary battery when a negative electrode tab is a three-layer clad tab. FIG. 5A illustrates a graph of time-dependent voltages and temperatures when a negative electrode tab is five-layer clad tab according to an embodiment, and FIG. 5B illustrates a picture of a secondary battery when the negative electrode tab is a five-layer clad tab according to an embodiment.

As a result of performing a short-circuit test at 55° C. by using a three-layer clad negative electrode tab of Ni—Cu—Ni of FIG. 3A and a five-layer clad negative electrode tab of Ni—Cu—Ni—Cu—Ni of FIG. 3B, it may be seen that ignition occurred in the event of a short circuit in a cell based on the three-layer clad negative electrode tab. Serious melting of an insulating member between the vent and the cap-down portion and a gasket between the cap-up portion and the can could be observed in a current interrupt device (CID) cross section analysis. Accordingly, it may be seen that there is risk of generating a current flow between the vent and the cap-down portion and between the cap-up portion and the can in the event of a short circuit when using the three-layer clad negative electrode tab.

As for a short circuit generation mechanism of the circular secondary battery, when an external short circuit is generated, a short-circuit current may be applied and heat may be generated from the negative electrode tab to contract the separator and thus generate a short between the positive and negative electrode plates. Accordingly, an internal short circuit may be generated, an additional short-circuit current may be applied, and the short-circuit area of a negative electrode tab portion may be increased to accelerate the temperature increase of the secondary battery and thus generate a thermal runaway phenomenon.

However, as illustrated in FIG. 5A, it may be seen that the short circuit is significantly reduced in the case of using a five-layer negative electrode tab including Ni—Cu—Ni—Cu—Ni including two Cu layers according to an embodiment.

As a metal material, the resistance per unit area of Ni is about four times greater than that of Cu. Accordingly, in the case of using a five-layer clad negative electrode tab including two Cu layers according to an embodiment, the resistance of the negative electrode tab may be reduced to reduce the heat generation amount thereof. Consequently, the high-temperature short-circuit characteristics of the secondary battery may be improved.

In this case, the reason for not forming the negative electrode tab of only Cu having low resistance is as follows. When the electrode assembly, the case or the cap assembly is welded to the negative electrode tab, Cu is melted by heat. When the Cu content thereof is high, Cu spattering may be generated by the melting of Cu and thus a micro short circuit of the secondary battery may be induced by the minute particles resulting from the spattering. The weldability between the negative electrode tab and the electrode assembly, the case or the cap assembly may be significantly degraded.

In the five-layer clad negative electrode tab, the sum of thicknesses of Cu layers may be less than the sum of thicknesses of Ni layers. For example, the sum of the thicknesses of the Cu layers may be less than or equal to 30% of the total thickness of the clad electrode tab. When the sum of the thicknesses of the Cu layers is greater than 30% of the total thickness of the clad electrode tab, a Cu spattering problem could be generated, as described above.

One end portion of the five-layer clad negative electrode tab may be welded to the negative electrode plate, and the other end portion of the five-layer clad negative electrode tab may be welded to the case or the cap assembly. The welding between the five-layer clad negative electrode tab and the negative electrode plate, the case or the cap assembly may be performed by any one of ultrasonic welding, laser welding, and resistance welding.

Figure 6A:
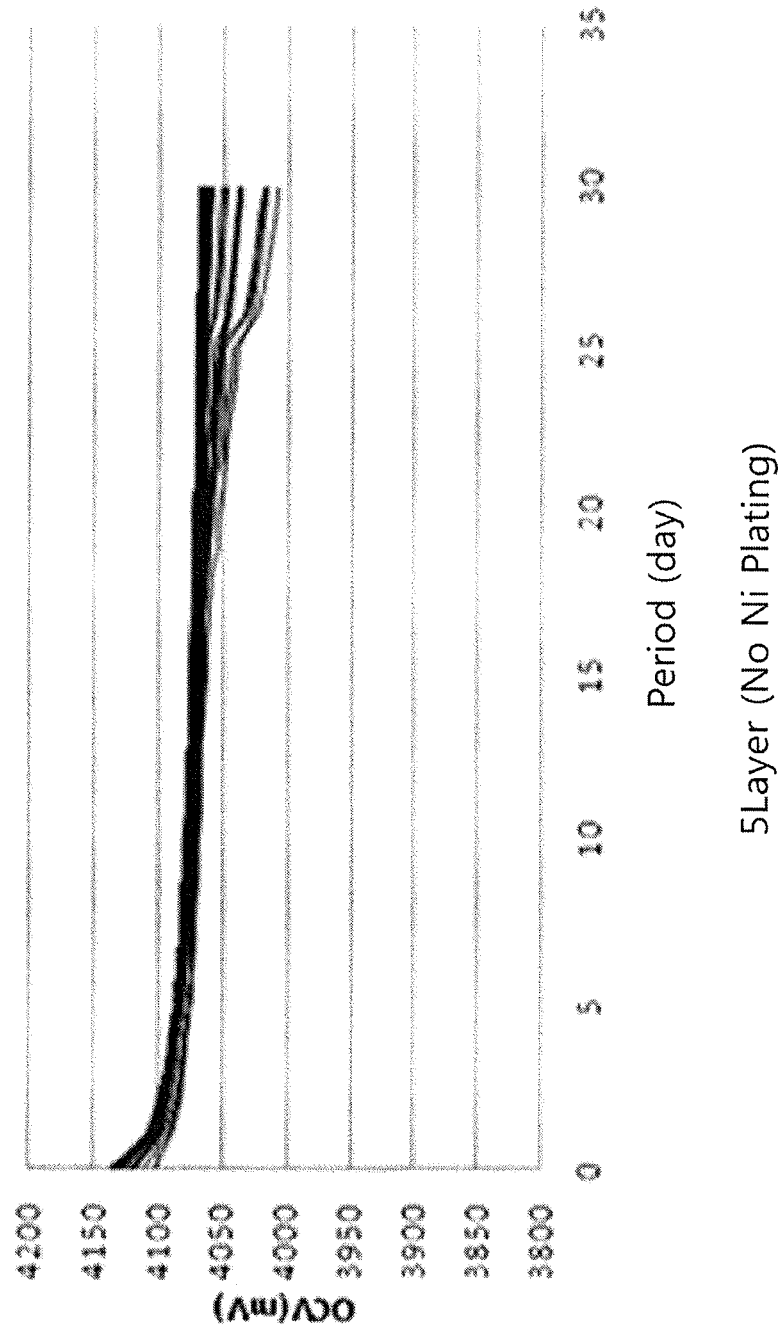
FIG. 6A illustrates a graph of high-temperature storage test results of a secondary battery when a five-layer clad tab is used as a negative electrode tab according to an embodiment.
Figure 6B:
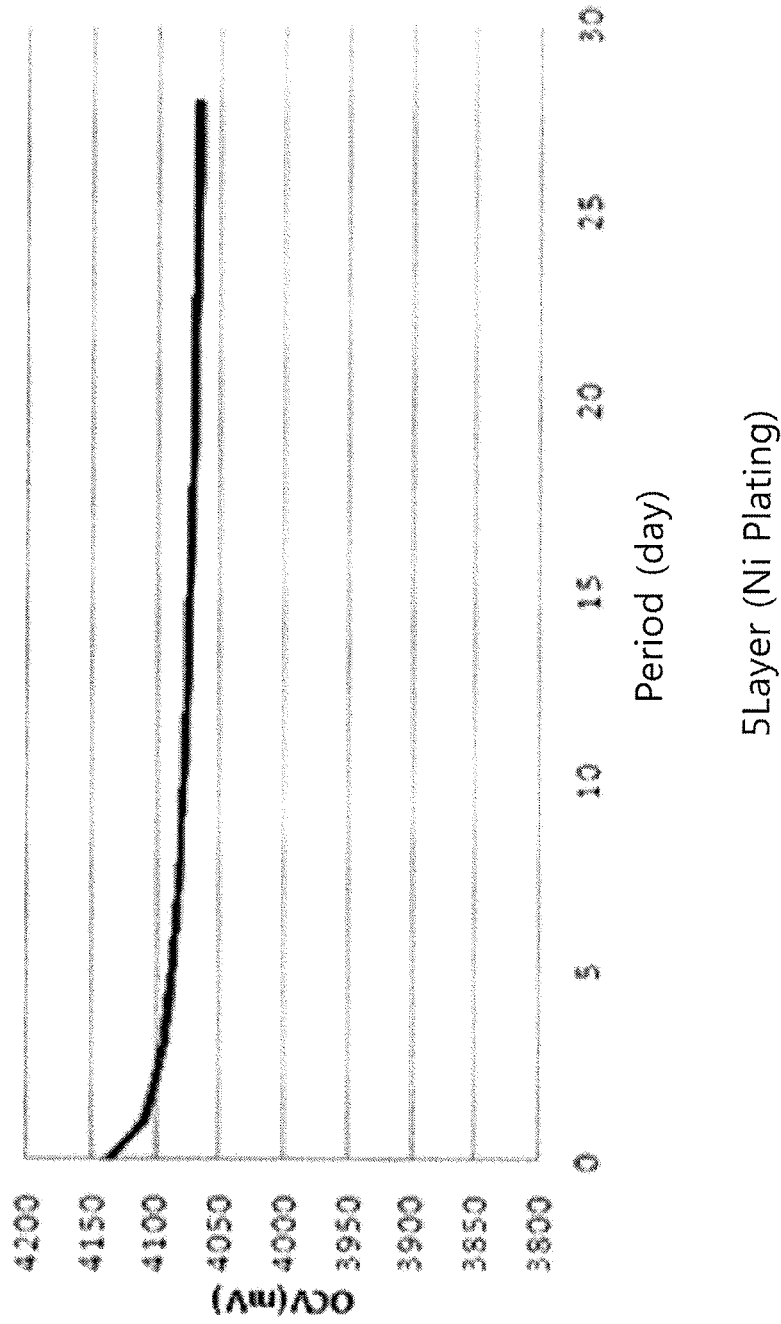
FIG. 6B illustrates a graph of high-temperature storage test results of a secondary battery when a five-layer clad tab that is post-plated with nickel is used as a negative electrode tab according to another embodiment.

FIG. 6A illustrates a graph showing the high-temperature storage test results of a secondary battery when a five-layer clad electrode tab is applied as a negative electrode tab according to an embodiment. FIG. 6B illustrates a graph showing the high-temperature storage test results of a secondary battery when a five-layer clad electrode tab post-plated with nickel is applied as a negative electrode tab according to another embodiment.

Referring to FIGS. 6A and 6B, it may be seen that an open-circuit voltage (OCV) drop occurs in the five-layer clad electrode tab without Ni post-plating in the case of high-temperature and long-term storage of the circular secondary battery, unlike in the five-layer clad electrode tab with Ni post-plating.

For example, Ni post-plating layers are further included on both outermost sides of the five-layer clad electrode tab of FIG. 6B. From the high-temperature and long-term storage test results of the negative electrode tab with the Ni post-plating layer formed therein, it can be seen that the nonoccurrence of an OCV drop is due to the welding. Accordingly, it may be seen that the weldability of the negative electrode tab is improved in the case of Ni post-plating.

For example, it may be seen that the negative electrode tab obtained by performing Ni post-plating on the clad electrode tab has the highest stability with respect to a high-power model of the circular battery. According to the above embodiments, the high-temperature short-circuit characteristics of the secondary battery may be improved. The resistance of the secondary battery may be reduced. Accordingly, the heat generation amount thereof may be reduced, and ultimately, the secondary battery may be protected against explosion and malfunction.

As described above, a five-layer clad tab post-plated with nickel may be used as a negative electrode tab to reduce the resistance and heat of the negative electrode tab. Accordingly, a high-power and high-stability secondary battery may be implemented.

By way of summation and review, in order for an electrode assembly of a secondary battery to be electrically connected to the cap assembly, a positive electrode tab and a negative electrode tab are formed to protrude from a top portion thereof. In general, the positive electrode tab may be formed of aluminum (Al) or Al alloy, and the negative electrode tab may be formed of nickel (Ni) or Ni alloy.

To reduce resistance and heat of a negative electrode portion and prevent a short circuit, a current application capability of a negative electrode tab may be improved by using a five-layer clad tab post-plated with nickel as the negative electrode tab Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:
1. A secondary battery, comprising:
an electrode assembly including a first electrode plate including a first electrode tab, a second electrode plate including a second electrode tab, and a separator interposed between the first electrode plate and the second electrode plate;

a case accommodating the electrode assembly; and a cap assembly covering a top portion of the case, wherein any one of the first electrode tab or the second electrode tab is a multi-layer clad electrode tab including nickel-copper-nickel-copper-nickel (Ni—Cu—Ni—Cu—Ni) layers, the multi-layer clad electrode tab is formed at only a single point on any one of the first electrode plate or the second electrode plate, and the multi-layer clad electrode tab has a Ni—Cu—Ni—Cu—Ni structure obtained by forming a three-layer clad structure of Cu—Ni—Cu and forming Ni layers on both of the Cu layers of the three-layer clad structure of Cu—Ni—Cu by post-plating.

2. The secondary battery as claimed in claim 1, wherein in the multi-layer clad electrode tab, a sum of thicknesses of the Cu layers is less than a sum of thicknesses of the Ni layers.

3. The secondary battery as claimed in claim 2, wherein the sum of the thicknesses of the Cu layers is less than or equal to 30% of a total thickness of the multi-layer clad electrode tab.

4. The secondary battery as claimed in claim 1, wherein the multi-layer clad electrode tab has a negative polarity.

* * * * *